United States Patent
Bachhuber et al.

(10) Patent No.: US 11,405,596 B2
(45) Date of Patent: Aug. 2, 2022

(54) PASSENGER CABIN, LIGHTING ARRANGEMENT AND OPERATING METHOD

(71) Applicant: DIEHL AEROSPACE GMBH, Ueberlingen (DE)

(72) Inventors: Martin Bachhuber, Altdorf (DE); Tobias Mengel, Cologne (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/555,306

(22) Filed: Aug. 29, 2019

(65) Prior Publication Data

US 2020/0070981 A1 Mar. 5, 2020

(30) Foreign Application Priority Data

Aug. 29, 2018 (DE) .......................... 102018006840.5

(51) Int. Cl.
*H04N 9/31* (2006.01)
*B64D 11/00* (2006.01)
*G09G 5/10* (2006.01)

(52) U.S. Cl.
CPC ....... *H04N 9/3147* (2013.01); *B64D 11/0015* (2013.01); *B64D 2011/0038* (2013.01);
(Continued)

(58) Field of Classification Search
CPC .............. H04N 9/3147; B64D 11/0015; B64D 2011/0038; B64D 2011/0061;
(Continued)

(56) References Cited

U.S. PATENT DOCUMENTS 8,277,053 B2 * 10/2012 Vogel ................. B64D 11/0015
353/94
8,461,505 B2 * 6/2013 Budinger ................. B60Q 3/43
250/208.1
(Continued)

FOREIGN PATENT DOCUMENTS

DE 102007008164 A1 8/2008
DE 102012108956 A1 3/2014
(Continued)

*Primary Examiner* — Bao-Luan Q Le
(74) *Attorney, Agent, or Firm* — Scully Scott Murphy and Presser

(57) ABSTRACT

A lighting arrangement for a passenger cabin of an aircraft is provided. The lighting arraignment has a display surface for displaying image content, at least two luminaires in a lighting environment of the display surface and a control unit. The luminaires radiate light in accordance with at least one lighting parameter. In the control unit, each luminaire is assigned part of the display surface as an evaluation region and a mapping rule. The mapping rule assigns image content of the evaluation region values of the lighting parameters. The control unit, for each of the luminaires, assigns the image content of its evaluation region values of its lighting parameters using the mapping rule and actuates the luminaires with the values with regard to the assigned lighting parameters. A passenger cabin having the lighting arrangement and a method for actuating the luminaires are also provided.

15 Claims, 3 Drawing Sheets

(52) U.S. Cl.
CPC ........ *B64D 2011/0061* (2013.01); *G09G 5/10* (2013.01); *G09G 2320/0626* (2013.01); *G09G 2320/0666* (2013.01); *G09G 2380/12* (2013.01)

(58) Field of Classification Search
CPC ... G09G 2320/0626; G09G 2320/0646; G09G 2320/0666; G09G 2380/12; G09G 3/001; G09G 5/10
See application file for complete search history.

(56) References Cited

U.S. PATENT DOCUMENTS

| | | | | |
|---|---|---|---|---|
| 8,608,317 | B2 * | 12/2013 | Babst | ................... H04N 9/3147 353/70 |
| 9,549,441 | B2 * | 1/2017 | Eakins | ................... H05B 45/50 |
| 10,303,414 | B2 * | 5/2019 | Watanabe | ............ H04N 9/3155 |
| 10,712,989 | B2 * | 7/2020 | Riedel | ..................... G09G 5/12 |
| 2010/0201951 | A1 * | 8/2010 | Budinger | ................. B60Q 3/47 353/13 |
| 2010/0214496 | A1 * | 8/2010 | Vogel | ................. B64D 11/0015 348/744 |
| 2011/0095911 | A1 * | 4/2011 | Babst | ................... H04N 9/3147 340/945 |
| 2011/0163697 | A1 | 7/2011 | Mizukami et al. | |
| 2014/0085337 | A1 * | 3/2014 | Velten | ..................... G06F 3/017 345/635 |
| 2014/0313751 | A1 | 10/2014 | Abel | |
| 2015/0271885 | A1 * | 9/2015 | Eakins | ................... B64D 11/00 315/294 |
| 2018/0018139 | A1 * | 1/2018 | Watanabe | ............ H04N 9/3191 |
| 2018/0081615 | A1 * | 3/2018 | Riedel | ..................... G09G 5/10 |

FOREIGN PATENT DOCUMENTS

| | | |
|---|---|---|
| DE | 102013207062 A1 | 10/2014 |
| EP | 2 792 547 A2 | 10/2014 |
| EP | 2 921 773 A1 | 9/2015 |

* cited by examiner

PASSENGER CABIN, LIGHTING ARRANGEMENT AND OPERATING METHOD

BACKGROUND OF THE INVENTION

The invention relates to the lighting of a passenger cabin, wherein image content is depicted on a display surface and light is generated by luminaires.

DISCUSSION OF THE PRIOR ART

In known cabin projection systems—that is to say the projection of image content onto interior surfaces of a passenger cabin of an aircraft—large-area images (for example panoramic images) are generated by dividing the image over a plurality of projectors. In addition to a cabin projection system, a passenger cabin also contains additional luminaires for generating light, for example wash lights, spotlights, etc.

SUMMARY OF THE INVENTION

The present invention is directed to improving lighting in a corresponding passenger cabin of an aircraft. The present invention is based on the assumption that or is intentionally configured such that the passenger cabin contains or has a display surface. Image content is able to be depicted on the display surface, or said image content is depicted during operation of the display surface. The display surface in this case has at least two surface portions. Each of the surface portions serves to depict a respective content portion of the image content. The depicted image content is based on the emission of light, for example light of an actively lighting screen or reflected light of a projector, and constitutes a type of light source.

The lighting arrangement contains at least two luminaires. When the lighting arrangement is installed in the aircraft, the luminaires are in this case arranged as intended in a lighting environment of the display surface. Each of the luminaires serves to radiate light in accordance with at least one respective changeable lighting parameter (for example colour or colour coordinate, brightness, temporal profile, etc.). The "lighting environment" is understood to mean a set of all of the locations that have a particular maximum distance from the display surface and in this case have the following property: When a luminaire is installed in the lighting environment and this is operated at the same time as the image content is displayed, an observer is able to perceive the light from the luminaire and the image content (or the accompanying light) together and combine them with one another. The observer thus perceives for example harmonies and disharmonies between brightnesses and/or colours of both elements or light radiations.

The lighting arrangement furthermore contains a control unit. In the control unit, each of the luminaires is assigned at least part of the display surface, in particular a real part, in particular an edge region, as evaluation region. In the control unit, each of the luminaires is also assigned a mapping rule. The mapping rule assigns image content of the evaluation region of a particular luminaire values of the lighting parameters for the accordingly assigned luminaire.

The control unit is furthermore configured, for each of the luminaires, so as to assign the image content of its evaluation region values of its lighting parameters using the mapping rule, that is to say so as to use or to implement the mapping rule in accordance with its intended purpose. The control unit is also configured so as to actuate each of the luminaires with the values with regard to the assigned lighting parameters, such that it emits light in accordance with the lighting parameter when it is operating.

The display surface is in particular part of the surface of the passenger cabin, in particular a ceiling section, wall section, floor section, etc. Installations such as luggage compartments, separating walls, monuments, etc. also count as a "surface". The evaluation region is in particular not bound to the surface portions or their boundaries, and may therefore extend in particular across two or more surface portions. The evaluation region may also be composed of subregions that are separated from one another, in particular spaced apart from one another.

By assigning the values of the lighting parameters using the image content, the values are generated "automatically".

The invention is based on the following considerations or findings: Lighting elements are also typically present in the immediate vicinity of a display surface (for example a projection screen). If the projection is performed for example onto ceiling panels as a display surface, the ceiling lighting or its luminaires are in the immediate vicinity. Since both the image content of the projection or the corresponding light and the light generated by the luminaires are able to be perceived together by an observer, it is desirable, from an optical point of view, that is to say in terms of light colour, brightness and temporal profile, to harmonize the light from the luminaires with the displayed image content. Defining dynamic light scenarios with a fine-grained definition is very complex. The basic concept of the invention is therefore to find a solution in which the light scenes are able to be calculated automatically. A light scene is the light generated by several or all of the luminaires in question. The luminaires in question are the lighting elements (luminaires) adjoining the images. The "images" are the display surfaces with image content. The automatic generation should be based on or dependent on the image content displayed on the display surface.

One particular feature in this case is that the image content is distributed over a plurality of surface portions, for example a plurality of screens. The concept of the invention is to use the harmonization to achieve a pleasant ambience in the cabin, in which brightness and colour of the light system (of the luminaires) match the displayed image (image content). A further concept is to generate the impression of a "larger projection surface" using the adjusted light system.

According to the invention, the values of the lighting parameters are determined automatically, as a result of which light scenes (values of the lighting parameters of a multiplicity of luminaires) no longer have to be adjusted manually.

In one preferred embodiment, the control unit is configured so as to assign at least one, in particular all, of the lighting parameters using the currently depicted image content and to actuate the luminaires in question with the current lighting parameter or lighting parameters. The currently depicted image content is thus assigned to a lighting parameter, and the luminaire is operated with the corresponding lighting parameter. This procedure may be performed once in order to carry out adaptive adjustment of the luminaires. In particular in the case of changing image content, this procedure may also be repeated, in particular periodically, for example at 1, 20, 50 or 100 Hz. A situation is thus achieved whereby the light from the luminaires dynamically follows the image content.

As an alternative, in this embodiment, the control unit is configured so as to assign at least one, in particular all, of the lighting parameters using defined image content and to actuate the luminaires in question with the corresponding lighting parameter or lighting parameters. This may be performed in particular by way of a preliminary calculation, for example before the beginning of a flight or when the aircraft cabin is redesigned (change of the image content). It is thus not necessary to determine the image content and to assign the lighting parameters during operation of the lighting arrangement or during a flight. A corresponding procedure requires image content that is already known. For example, light scenes may thus already be calculated in advance for known image content, and respective combinations then depicted when required.

In one preferred embodiment, at least one, in particular all, of the content portions is generated by a light source during operation and the control unit assigns an interface to the light source or light sources in question in order to receive the image content from the light source. The image content thus does not have to be determined by the display surface, for example using a camera. Instead of this, the source or the raw data of the image content are evaluated. It thus becomes particularly easy and reliable to record the image content in order to process it in accordance with the assignment to the lighting parameters.

In one preferred embodiment, at least one, in particular all, of the surface portions is a section of the surface of the passenger cabin that is illuminated by a dedicated projector as light source. "Dedicated projector" is in this case understood to mean that one projector in each case generates the image content of a surface portion. In the case of a plurality of such surface portions, each content portion is thus generated by a different projector. The corresponding projector is in particular part of the lighting arrangement. Projectors are particularly suitable for displaying image content, for example on complex surfaces. The abovementioned interface is expedient in particular in combination with projectors, since the image content is able to be determined particularly reliably and exactly here, without distortions caused by the projection path, masking etc. having to be taken into consideration.

In one preferred embodiment, at least one of the surface portions is a surface of a screen as light source. The light source of the image content to be generated is thus a screen. Within the meaning of the abovementioned "dedicated projector", in this case too, in particular each surface portion is formed by a dedicated, that is to say different screen. The screen in question is in particular again part of the lighting arrangement. Screens make it possible to depict content in a particularly simple manner. In this case too, the combination with a corresponding interface to the screen again optionally arises in order to determine the image content particularly reliably for the purposes of the assignment.

In one preferred embodiment, at least one of the evaluation regions is able to be placed freely in the display surface. "Place" in particular includes moving the region and/or changing the size and/or shape. By way of this, a basic adjustment of the assignment characteristics between image content on the display surface and lighting parameter is able to be influenced.

In one preferred embodiment, the evaluation region has a rectangular shape. The number of evaluation regions or subregions (see above) and/or their size and/or their aspect ratio and/or their position are in this case able to be defined freely. A rectangular shape is particularly simple to produce, especially with regard to digital data to be recorded as image content via the abovementioned interface.

In one preferred embodiment, the lighting parameter is a brightness and/or a colour coordinate of the light radiated by the luminaire during operation. The lighting parameters in question allow particularly effective adjustment of the character of the light generated by the luminaires to the image content.

In one preferred variant of this embodiment, the value of the lighting parameter "brightness" is the average of all of the brightnesses in the evaluation region. As an alternative or in addition, the value of the lighting parameter "colour coordinate" is the value of the in particular geometric centre point of all of the colour coordinates in the evaluation region. In particular in the case of digitized image content (screen or projector as light source, see above), the corresponding pixels of the content portion may be evaluated. This in particular again functions particularly simply and reliably in connection with the abovementioned interface to the light source in question.

In one preferred embodiment, the lighting environment is the display surface itself. A corresponding luminaire is then thus placed within the display surface. As an alternative or in addition, the lighting environment is a region directly adjoining the display surface or the edge thereof. In this case, a luminaire placed there thus directly adjoins the edge of the display surface. As an alternative or in addition, the lighting environment is a distance range of at most 2 metres from the display surface, that is to say from the edge of the display surface. A luminaire placed there is thus not more than 2 m away from the edge of the display surface and placed in the environment thereof. A corresponding luminaire is thus placed in particular directly or at a distance next to the display surface, in particular on the surface of the passenger cabin, which continues the display surface. Instead of 2 m, the lighting environment in particular extends up to a distance of at most 1 cm, 2 cm, 3 cm, 5 cm, 7.5 cm, 10 cm, 20 cm, 30 cm, 50 cm, 75 cm, 1 m or 1.5 m away from the edge of the display surface.

In one preferred embodiment, the image content to be depicted is a panoramic image and the respective content portion is a section of the panoramic image. The lighting arrangement according to the invention is particularly suitable for corresponding image content.

In one preferred embodiment, the control unit contains a configuration database in which at least one of the evaluation regions (or its data, such as for example position, size, shape, etc.) and/or at least one of the mapping rules and/or at least one of the assignments of the mapping rules to the luminaires is changeably stored. The lighting arrangement is thereby able to be adjusted particularly flexibly to image content to be displayed and/or a luminaire configuration or an intended passenger cabin in which these elements are intended to be used.

The present invention is also achieved by a passenger cabin containing the lighting arrangement according to the invention and its display surface. The luminaires are additionally arranged in the lighting environment of the display surface. The passenger cabin—if present—optionally also contains the abovementioned light sources and/or the image content to be displayed or the image data/brightness information on which this is based, etc.

The passenger cabin and at least some of the embodiments thereof and the respective advantages have already been explained analogously in connection with the lighting arrangement according to the invention.

The present invention is further directed to a method for actuating at least two luminaires of a passenger cabin of an aircraft, wherein the passenger cabin has a display surface. Image content is depicted on the display surface, wherein the display surface has at least two surface portions. A respective content portion of the image content is depicted on each of the surface portions. The luminaires are arranged in a lighting environment of the display surface. The luminaires radiate light in accordance with at least one respective changeable lighting parameter during operation. Each of the luminaires is assigned at least part of the display surface as evaluation region. Each of the luminaires is assigned a mapping rule, wherein the mapping rule assigns image content of the evaluation region a value of the lighting parameter. For each of the luminaires, the image content of its evaluation region is assigned values of its lighting parameters using the mapping rule. Each of the luminaires is actuated with the values with regard to the assigned lighting parameters.

The method and at least some of the embodiments thereof and the respective advantages have already been explained analogously in connection with the lighting arrangement according to the invention or the passenger cabin according to the invention.

In one preferred embodiment, the method is performed using the lighting apparatus according to the invention or using or in the passenger cabin according to the invention. The corresponding objects are particularly suitable for performing the method.

The invention is based on the following findings, observations or considerations and also includes the following embodiments. The embodiments are in this case also referred to as "the invention", partly for the purposes of simplification. The embodiments may in this case also contain parts or combinations of the abovementioned embodiments or correspond to them and/or possibly also include embodiments which have not yet been mentioned.

According to the invention, a system for depicting image content (projection system) is coupled to a scene controller for a cabin lighting system (control of lighting "scenes" by operating the luminaires with specific lighting parameters).

The invention makes it possible to automatically generate static and dynamic light scenarios for the lighting elements (luminaires) in the vicinity of displays or projection surfaces (display surface) depending on the displayed image content, as a result of which screens (also projectors, generally: the image content on the display surface) and lighting systems (luminaires) are supplemented in a harmonic manner.

The invention is achieved by way of flexibly definable evaluation regions in the displayed image content (in the display surface) and by way of flexibly assigning a lighting element (luminaire) to an evaluation region independently of the boundaries of the screen (of the surface portions). An evaluation region is in this case a region in the image to be displayed (image content, display surface) in which a representative brightness (lighting parameter) or a representative colour coordinate (lighting parameter) is determined in accordance with a freely selectable algorithm (mapping rule). Possible algorithms are in this case the averaging of the brightnesses of all of the pixels (of the image content) in the evaluation region or the determination of the centre point of the colour coordinates of all of the pixels in the evaluation region in order to determine brightness and colour coordinate (lighting parameter) of the assigned lighting element (luminaire). The typically rectangular evaluation regions are able to be defined freely in terms of number, aspect ratio, size and position. The evaluation regions may be for example calculated beforehand in a PC tool or calculated during operation in order to directly command the light system.

An evaluation region is assigned to a lighting element in a dedicated configuration database, and therefore independently of the composition of the overall image (image content) by individual images (content portions). It is therefore also not necessary for the lighting elements (luminaires) to match the screens (partial areas) in terms of size and arrangement.

According to the invention, the following advantages are achieved: the light scenarios are calculated automatically and possibly in advance (low computational burden during subsequent operation) or during operation (greater flexibility). The evaluation regions are able to be defined freely in terms of number, aspect ratio, size and position. The arrangement of the lighting elements (luminaire or illuminated surface) is independent of the arrangement of the projected images. The lighting arrangement is able to be scaled as desired with regard to projection surfaces, evaluation region and actuated lighting elements.

Aspects of the Invention are Inter Alia the automatic scene generation for the cabin lighting system (the proposed method may also be used to define light scenarios in general, for example on the basis of the video template of a designer), the flexible assignment of evaluation regions to a lighting element by way of a database, the independence of the lighting scenarios from type (projectors, displays), number and dimensions of the screens, the possibility of calculating light scenarios in advance or during service time in the aircraft.

BRIEF DESCRIPTION OF THE DRAWINGS

Further features, effects and advantages of the invention become apparent from the following description of one preferred exemplary embodiment of the invention and the appended figures. In the figures, in each case in a schematic diagram.

DETAILED DESCRIPTION OF THE INVENTION

Figure 1:
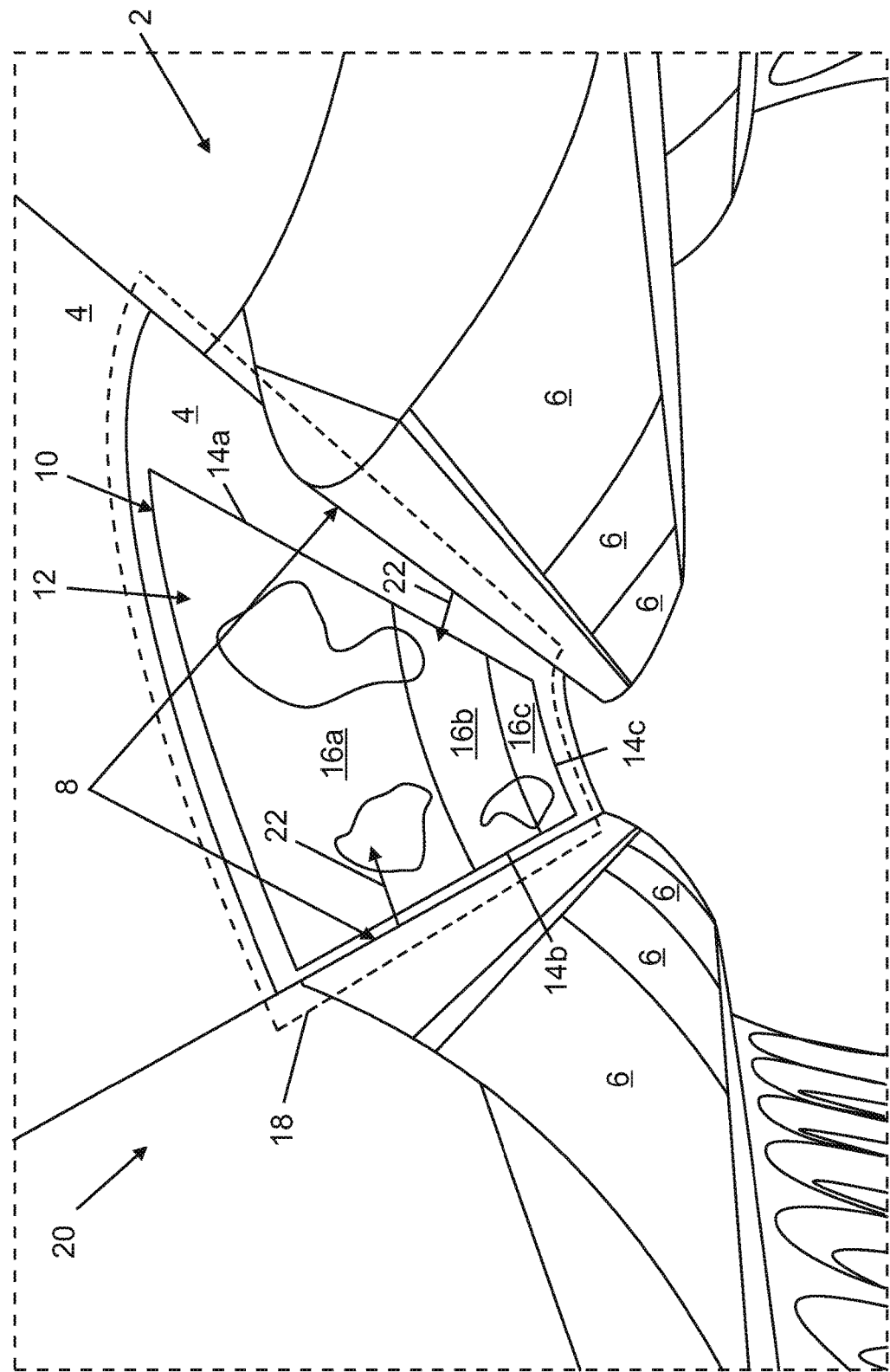
FIG. 1 shows a passenger cabin of an aircraft having a display surface and luminaires in a perspective illustration.

FIG. 1 shows a cutout of a passenger cabin 2 of an aircraft, not shown in more detail, namely essentially its ceiling region with ceiling panels 4 and luggage compartments 6. Luminaires 8 (here strip luminaires) in the form of cabin lighting or ceiling lighting are in each case arranged between the panels 4 and the luggage compartments 6 (indirectly, therefore not directly visible in FIG. 1). Some of the panels 4 in this case form a display surface 10 on which image content 12, here a panoramic image of a cloudy sky, is currently being displayed.

The display surface 10 in this case has three surface portions 14a-c, which each depict a content portion 16a-c of the image content 12. Each of the content portions 16a-c is generated by one of three projectors, not visible in FIG. 1. The surface portions 14a-c are thus respective sections of the surface of the passenger cabin 2 (of the panels 4) that are illuminated by in each case one of the projectors in order to display the respective content portion 16a-c.

The luminaires 8 are positioned in a lighting environment 18 of the display surface 10. The lighting environment 18 is in this case that region at a maximum distance of 30 cm from the display surface 10 and indicated by a dashed line.

The luminaires 8 are part of a lighting arrangement 20 and emit light 22 (indicated symbolically here only by an arrow) during active operation.

Figure 2:
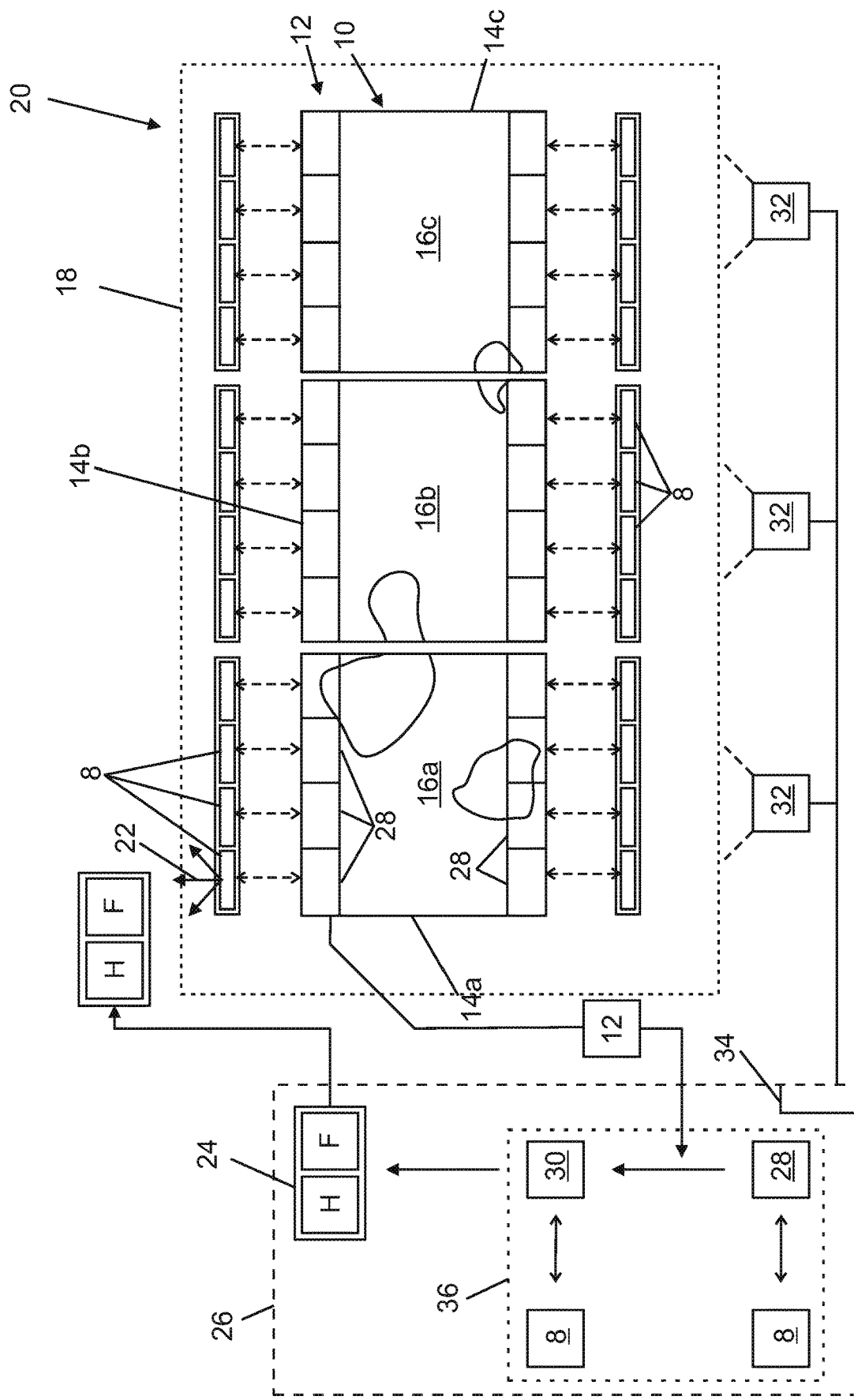
FIG. 2 shows a lighting arrangement according to the invention in a basic overview.

FIG. 2 symbolically shows the lighting arrangement 20 for the passenger cabin 2 from FIG. 1 in detail. The passenger cabin 2 has, as explained above, the display surface 10 with the surface portions 14a-c, on which the content portions 16a-c are depicted, which combine to form the image content 12. The lighting arrangement 20 additionally comprises a total of twenty-four luminaires 8 that are grouped into respective groups of four, wherein in each case three groups of four form one of the two strip luminaires indicated in FIG. 1. The luminaires 8 are all situated in the lighting environment 18 of the display surface 10. Each of the luminaires 8 in each case radiates light 22 (again depicted symbolically here by an arrow) during active operation. The light 22 in this case has lighting parameters 24, here a particular brightness H and a colour in the form of a colour coordinate F.

The lighting arrangement 20 additionally contains a control unit 26. In the control unit 26, each of the luminaires 8 is assigned part of the display surface 10 as evaluation region 28. The assignment is indicated symbolically as a double-headed arrow in FIG. 2. In the control unit 26, each of the luminaires 8 is additionally assigned a mapping rule 30. The mapping rule 30 assigns image content 12 (the portion thereof) in the respective evaluation region 28 of the respective luminaire 8 a value of the respective lighting parameters 24 for the respective luminaire 8. In the example, a value for the brightness H and a value for the colour coordinate F is therefore assigned to each individual luminaire 8. For the sake of clarity, this is illustrated explicitly for just a single luminaire.

The control unit 26 performs the corresponding assignment, and thus determines, in the example, for each luminaire 8, its values for the brightness H and the colour coordinate F, and actuates the respective luminaire 8 with the corresponding values in terms of brightness H and colour coordinate F.

The assignment between luminaire 8 and evaluation region 28 is able to be defined freely in this case. The evaluation regions 28 are able to be defined freely in terms of number, aspect ratio, size and position. The evaluation algorithm (mapping rule 30) is able to be defined freely. In the example, the centre point of the colour coordinate in the evaluation region 28 is determined as value of the colour coordinate F. The average brightness in the evaluation region 28 is determined as value for the brightness H. The arrangement of the lighting elements (both of the display surface 10 and of the luminaires 8) is independent of the arrangement of the projected images, since an assignment takes place. The lighting parameters 24 may selectively be determined in real time or through calculation in advance. The lighting arrangement 20 is able to be scaled with respect to the projection surfaces, that is to say to the display surfaces 10, to the evaluation regions 28 and to the actuated luminaires 8.

The content portions 16a-c are generated in the example by in each case one light source 32, here a respective projector, per surface portion 14a-c. To determine or to receive the image content 12 (or the respective portions of the overall image content 12) within the evaluation regions 28, the control unit 26 has an interface 34 to the light sources 32.

The evaluation regions 28 (or their size, position, etc.), the mapping rules 30 for all of the luminaires 8 and the respective assignments of these elements to the luminaires 8 are stored in a configuration database 36 (indicated by a dashed frame) of the control unit 26.

FIG. 3 once again shows the lighting arrangement 20 from FIG. 2, the control unit 26 being omitted for the sake of simplicity. In this case, the surface portions 14a-c are configured in an alternative design as three surfaces of three screens as a respective light source 32. Applied to FIG. 1, three screens are thus recessed into the panels 4 as light sources 32, whose surfaces form the surface portions 14a-c. The content portions 16a-c are the image information depicted on the screens.

In this case, the "lighting elements" in the form of the groups of four luminaires 8 do not correspond to the surface portions 14a-c, as is the case in FIG. 2.

Figure 3:
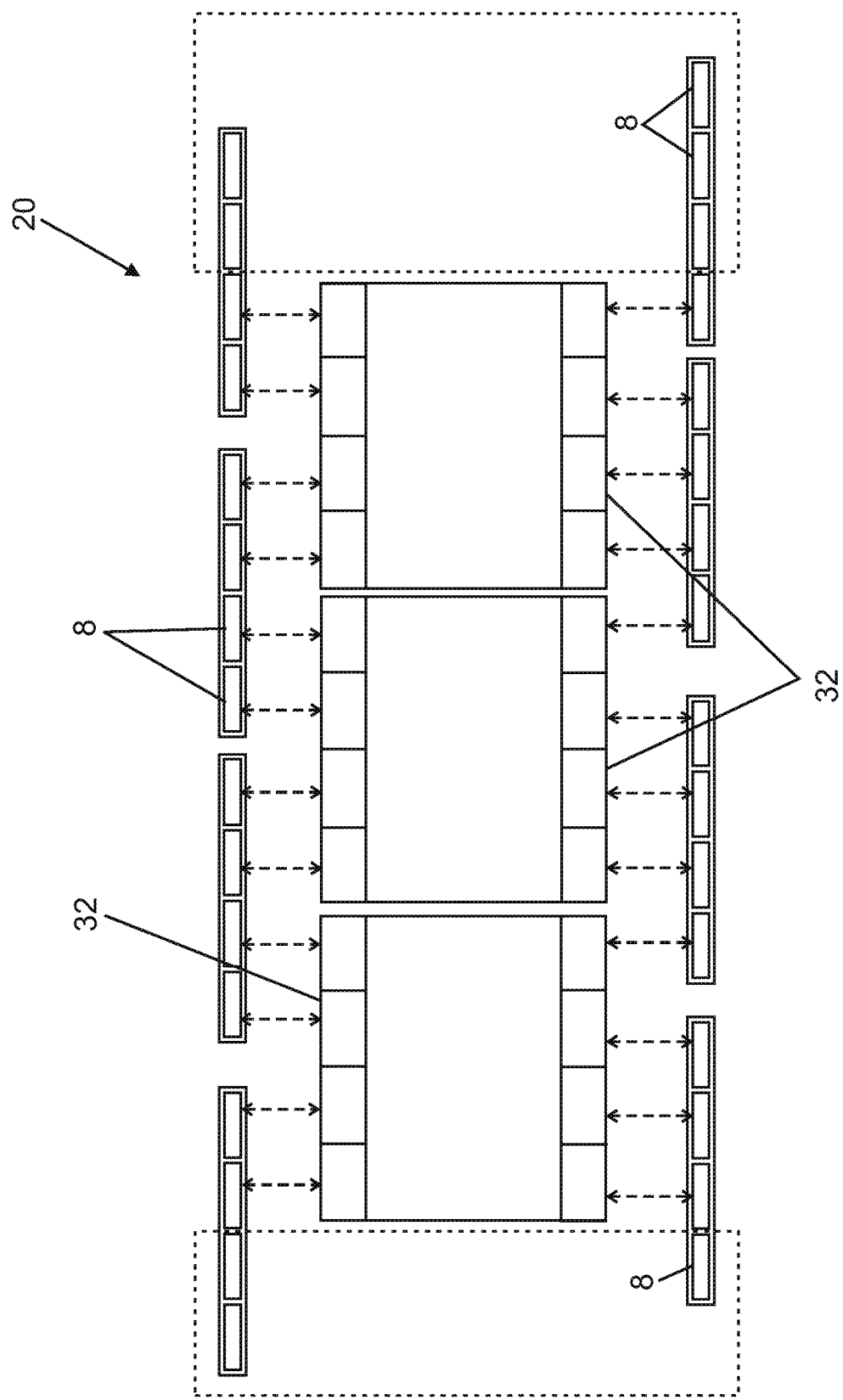
FIG. 3 shows part of an alternative lighting arrangement according to the invention in a basic overview.

In FIG. 3, in addition to the twenty-four luminaires 8 of the lighting arrangement 20, which are thus arranged in alternative groups of four here, a further eight luminaires 8 are also provided, which thus form "protruding" lighting elements (illustrated by dashed frames). These may be controlled independently of the luminaires 8 of the lighting arrangement 20, and thus independently of the image content 12.

LIST OF REFERENCE SIGNS

2 Passenger cabin
4 Panel
6 Luggage compartment
8 Luminaire
10 Display surface
12 Image content
14a-c Surface portion
16a-c Content portion
18 Lighting environment
20 Lighting arrangement
22 Light
24 Lighting parameter
26 Control unit
28 Evaluation region
30 Mapping rule
32 Light source
34 Interface
36 Configuration database
H Brightness
F Colour coordinate

What is claimed is:

1. A lighting arrangement for a passenger cabin of an aircraft, comprising:
   a display surface on which image content is able to be depicted, wherein the display surface has at least two surface portions for depicting respective content portions of the image content, wherein said content portions of the image content are generated only by projectors,
   at least two luminaires are situated by arrangement as intended in the same lighting environment of the display surface for radiating light, separate and distinct from the image content and radiating light of the display surface produced solely by the projectors, and in accordance with at least one changeable lighting parameter, and a control unit in which each of the luminaires is assigned at least part of the display surface as an evaluation region, wherein, in said evaluation region, each of the luminaires is assigned a mapping rule, wherein the mapping rule assigns an image content to the evaluation region as values of the luminaire lighting parameters, and wherein the control unit is configured, for each of the luminaires, to assign the image content of the evaluation region values of the lighting parameters using the mapping rule, to actuate each of the luminaires with the values of the assigned lighting parameters and to control and harmonize the radiating light of the luminaire with the radiating light of the display surface being radiated by the respective content portions of the image content, thereby controlling and harmonizing the lighting of the luminaires with the image of the display, which display image is produced solely by the projectors, wherein the image content provided by the projectors is independent of the lighting of the luminaires, wherein at least one of the evaluation regions is placed freely in the display surface to evaluate only the image content produced by the projectors and the control unit includes a configuration database in which the at least one evaluation region, the mapping rules and the assignment to the luminaires is changeably stored, and wherein the luminaires only produce radiating light which does not contribute to the image content which is produced solely by the projectors.

2. The lighting arrangement according to claim 1, wherein the control unit is configured to assign at least one of the lighting parameters using the currently depicted image content and to actuate the luminaires in question with the current lighting parameter.

3. The lighting arrangement according to claim 1, wherein at least one of the content portions is generated by a light source during operation, and the control unit has an interface to the light source in order to receive the image content from the light source.

4. The lighting arrangement according to claim 1, wherein at least one of the surface portions is a section of the surface of the passenger cabin that is illuminated by a dedicated projector as a light source.

5. The lighting arrangement according to claim 1, wherein at least one of the surface portions is a surface of a screen as light source.

6. The lighting arrangement according to claim 1, wherein the evaluation region has a rectangular shape.

7. The lighting arrangement according to claim 1, wherein the lighting parameter is a brightness (H) and/or a colour coordinate (F) of the light radiated by the luminaire during operation.

8. The lighting arrangement according to claim 7, wherein the value of the lighting parameter, brightness (H), is the average of all of the brightnesses (H) in the evaluation region and/or the value of the lighting parameter, colour coordinate (F), is the value of the centre point of all of the colour coordinates (F) in the evaluation region.

9. The lighting arrangement according to claim 1, wherein the lighting environment is the display surface itself and/or the lighting environment is a region directly adjoining the display surface and/or a distance range of at most two metres from the display surface.

10. The lighting arrangement according to claim 1, wherein the image content is a panoramic image and the respective content portion is a section of the panoramic image.

11. A passenger cabin, having the lighting arrangement according to claim 1 and having the display surface, wherein the luminaires are arranged in the lighting environment of the display surface.

12. A method for actuating at least two luminaires of a passenger cabin of an aircraft having a display surface on which image content is depicted, wherein the display surface has at least two surface portions and a respective content portion of the image content is depicted on each of the surface portions, wherein the luminaires are arranged in a lighting environment of the display surface, wherein the method is performed using a passenger cabin according to claim 11.

13. A method for actuating at least two luminaires of a passenger cabin of an aircraft having a display surface on which image content is depicted, wherein the display surface has at least two surface portions and a respective content portion of the image content is depicted on each of the surface portions, wherein the luminaires are arranged in a lighting environment of the display surface, wherein the method is performed using a lighting apparatus according to claim 1.

14. The lighting arrangement according to claim 1, wherein the control unit is configured to assign at least one of the lighting parameters using defined image content and to actuate the luminaires in question with the corresponding lighting parameter.

15. A method for actuating at least two luminaires of a passenger cabin of an aircraft having a display surface on which image content is depicted, wherein the display surface has at least two surface portions and a respective content portion of the image content is depicted on each of the surface portions, wherein the luminaires are arranged in the same lighting environment of the display surface and wherein said content portions of the image are generated solely by projectors, wherein the luminaires radiate light separate and distinct from the image content and radiating light of the display surface produced solely by the projectors and, in accordance with at least one changeable lighting parameter, in which:

each of the luminaires is assigned at least part of the display surface as an evaluation region, wherein each of the luminaires is assigned a mapping rule, wherein the mapping rule assigns an image content of the evaluation region as a value of the lighting parameter, wherein for each of the luminaires, the image content of the evaluation region is assigned values of the lighting parameters using the mapping rule, and actuating each of the luminaires with the values of the assigned lighting parameters and controlling and harmonizing the radiating light of the luminaire with the radiating light of the display surface being radiated by the respective content portions of the image content produced solely by the projectors, thereby controlling and harmonizing the lighting of the luminaires with the image of the display, which display image is produced solely by the projectors, wherein the image content provided by the projectors is independent of the lighting of the luminaires, wherein at least one of the evaluation regions is placed freely in the display surface to evaluate only the image content produced by the projectors and the control unit includes a configuration database in which the at least one evaluation region, the mapping rules and the assignment to the luminaires is changeably stored, and wherein the luminaires only produce radiating light which does not contribute to the image content which is produced solely by the projectors.

* * * * *